United States Patent [19]

Greene et al.

[11] Patent Number: 4,906,729
[45] Date of Patent: Mar. 6, 1990

[54] THERMOPLASTIC COPOLYETHERESTER ELASTOMERS

[75] Inventors: Robin N. Greene, Wilmington, Del.; George R. Goodley, Kinston, N.C.; Charles King, Richmond, Va.

[73] Assignee: E. I. Du Pont de Nemours and Company, Wilmington, Del.

[21] Appl. No.: 229,031

[22] Filed: Aug. 5, 1988

[51] Int. Cl.[4] ............................................. C08G 63/02
[52] U.S. Cl. .................... 528/272; 528/298; 528/300; 528/302; 528/308; 528/308.1
[58] Field of Search ............... 528/272, 298, 300, 302, 528/308, 308.1

[56] References Cited

U.S. PATENT DOCUMENTS

| | | |
|---|---|---|
| 3,896,078 | 7/1975 | Hoeschele . |
| 3,904,706 | 9/1975 | Hoeschele . |
| 3,907,926 | 9/1975 | Brown et al. . |
| 4,013,624 | 3/1977 | Hoeschele . |
| 4,221,703 | 9/1980 | Hoeschele . |
| 4,250,280 | 2/1981 | Tanaka et al. ...................... 525/437 |
| 4,725,481 | 2/1988 | Ostapchenko ...................... 428/213 |
| 4,778,855 | 10/1988 | Boutni et al. ...................... 525/146 |

Primary Examiner—Morton Foelak
Assistant Examiner—S. A. Acquah

[57] ABSTRACT

A segmented thermoplastic copolyetherester having soft segments formed from a long chain polyalkyleneether glycol containing 80 to 97 mole percent of copolymerized tetrahydrofuran and 3 to 20 mole percent of a copolymerized cyclic alkylene oxide, preferably copolymerized 3-methyltetrahydrofuran, provides fibers and films with an improved combination of high tenacity, high unload power, high melting temperatures and low set.

16 Claims, 5 Drawing Sheets

THERMOPLASTIC COPOLYETHERESTER ELASTOMERS

BACKGROUND OF THE INVENTION

1. Field of the Invention

This invention relates to a thermoplastic, segmented, linear copolyesterether elastomer. More particularly, the invention concerns such an elastomer having a soft segment formed with a polyether containing tetrahydrofuran and a minor amount of a second ether monomer, such as 3-methyltetrahydrofuran.

2. Description of the Prior Art

A wide variety of thermoplastic, linear polyetheresters have been suggested for various purposes, particularly for the production of molded articles, films and fibers. Such polyetheresters are known, as for example from Witsiepe U.S. Pat. No. 3,766,146, McCormack et al U.S. Pat. No. 4,136,715, Wolfe U.S. Pat. No. 3,775,374, Bell et al U.S. Pat. No. 3,243,413, and Nishimura, et al, "Elastomers Based on Polyester", J. Macromol. Sci. (Chem.), A1(4), 617-625 (1967) among others. However, most of these polyetherester elastomers are not suited for certain specialty applications. For example, elastomeric strands intended for use in elastification of diaper legs or elastomeric fibers intended to be mixed with textile fibers such as nylon for use in heat-set stretch fabrics require a combination of good tensile properties, high elasticity, high melting temperatures and low set. An object of this invention is to provide a thermoplastic elastomer that can be converted into fibers or films suitable for the above-mentioned uses.

SUMMARY OF THE INVENTION

The present invention provides a thermoplastic, segmented, linear copolyetherester elastomer which consists essentially of a multiplicity of recurring intralinear long-chain and short-chain ester units connected head-to-tail through ester linkages, the long-chain ester units amounting to 70 to 90 weight percent of the elastomer and being represented by the structure (I)

and the short-chain ester units amounting to 10 to 30 weight percent of the elastomer being represented by the structure (II)

wherein

R represents a divalent radical remaining after removal of carboxyl groups from a dicarboxylic acid selected from the group consisting of terephthalic acid and 2,6-naphthalenedicarboxylic acid, G represents a divalent radical remaining after removal of hydroxyl groups from a long chain polyalkyleneether glycol containing 80 to 97 mole percent of copolymerized tetrahydrofuran and 3 to 20 mole percent of a copolymerized cyclic alkylene oxide having 2, 3 or 4 carbon, atoms and an n-alkyl substituent of 1 or 2 carbon atoms attached to one of the carbon atoms of the cyclic alkylene oxide and has a number average molecular weight in the range of 1,500 to 5,000 and D is a divalent radical remaining after removal of terminal hydroxyl groups from a diol selected from the group consisting of ethylene glycol and 1,4-butane diol.

A preferred cyclic alkylene oxide is 3-methyltetrahydrofuran which preferably is incorporated into the elastomer as a copolyether of tetrahydrofuran.

The present invention also provides fibers and films of the copolyetherester elastomer and processes for their manufacture and treatment.

BRIEF DESCRIPTION OF THE DRAWINGS

The invention will be better understood by reference to the drawings which present graphs of the percent set of meltspun and drawn fibers prepared from different elastomers of the invention as a function of the molar ratio of the hard segment to soft segment of the elastomer. Data from which these Figures were constructed are given in the Examples.

DETAILED DESCRIPTION OF PREFERRED EMBODIMENTS

In the discussion that follows, the focus is primarily on elastomers of the invention that are formed from copolyethers of tetrahydrofuran and the preferred cyclic alkylene oxide monomer 3-methyltetrahydrofuran. However, equivalent results can be obtained when the cyclic alkylene ether content of elastomer is provided by a blend of polyethers made with the monomers.

For convenience, several abbreviations are employed herein, as follows:

| | |
|---|---|
| 2G/T | hard segment formed from ethylene glycol (2G) and terephthalic acid (T) |
| 4G/T | hard segment formed from 1,4-butane diol (4G) and terephthalic acid |
| 2G/2,6-N | hard segment formed from ethylene glycol and 2,6-naphthalene dicarboxylic acid (2,6-N) |
| 4G/2,6-N | hard segment formed from 1,4-butane diol and 2,6-naphthalene dicarboxylic acid. |
| THF | tetrahydrofuran |
| MeTHF | 3-methyltetrahydrofuran |
| PO | 1,2-propylene oxide |
| DMT | dimethyl terephthalate |
| TBT | tributyl titanate esterification catalyst |
| AO-330 | 1,3,5-Trimethyl-2,4,6-tris[3,5-di-tert-butyl-4-hydroxy-benzyl]benzene antioxidant sold by Ethyl Corp. |
| Irganox 1098 | N,N'—hexamethylene bis(3,5-di-t-butyl-4-hydroxy-hydrocinnamamide) antioxidant sold by Ciba Geigy |
| SS | soft segment of elastomer |
| HS | hard segment of elastomer |
| HS/SS | mole ratio of hard to soft segment |
| % HS | percent hard segment (based on total weight of elastomer) |
| MW | molecular weight of the long chain glycol (corrected for content of oligomeric cyclic alkylene oxides) |

The elastomer of this invention basically is made up of long chain ester units which constitute the "soft segments" of the elastomer and short chain ester units which constitute the "hard segments" of the elastomer.

In accordance with the present invention, the "long chain ester units", or "soft segments", are made by reacting terephthalic acid or 2,6-naphthalenedicarboxylic acid with a glycol of a random or block copolymer of tetrahydrofuran and minor amounts of a comonomer to form a long chain polymeric glycol. The long chain polymeric glycol has terminal (or as nearly terminal as possible) hydroxyl groups and a molecular weight in the range of about 1,500 to 5,000, preferably 2,000 to 3,800. Within these ranges, broad or narrow molewcular weight distributions are suitable for use in the invention. When incorporated into the elastomer, the long chain polymeric glycol forms the long chain ester repeating units (soft segments) of the elastomer and have the structure shown in Formula I above. Generally, the soft segments of the elastomers of the invention constitute 70 to 90 percent by weight of the total elastomer.

The comonomer of tetrahydrofuran is a cyclic alkylene oxide having 2, 3 or 4 carbon atoms in the alkylene oxide ring. An n-alkyl substituent of 1 or 2 carbon atoms, preferably methyl, is attached to a carbon atom of the alkylene oxide ring. Inclusion of such comonomers improves the set and unload power of the resulting elastomer without significantly decreasing its tenacity, as compared to similar elastomers in which such comonomers are not present. Among suitable cyclic alkylene oxide comonomers are 3-methyltetrahydrofuran, 1,2-propylene oxide, 3-methyloxetane and 3,3-dimethyloxetane. The preferred comonomer is 3-methyltetrahydrofuran. Copolyether glycols of tetrahydrofuran and 3-methyltetrahydrofuran can be prepared in accordance with the general procedures of Ernst, U.S. Pat. No. 4,590,285, which disclosure is hereby incorporated herein by reference. Generally, the amount of comonomer is in the range of 3 to 20 mole percent of total amount of tetrahydrofuran and comonomer in the elastomer. Preferably, this mole percentage is in the range of 7 to 15. The desired mol percent of comonomer can also be obtained by blending of long chain glycols. For example, such a glycol having a high content of the comonomer can be blended with one having a lower comonomer content or no comonmer at all. The desired molecular weight of the glycol can be similarly obtained by blending.

The "short chain ester units", or "hard segments" are formed by reacting terephthalic acid or 2,6-naphthalenedicarboxylic acid with ethylene glycol or 1,4-butane diol, to form a polyester. When incorporated into the elastomer, the polyester forms the short chain ester repeating units (hard segments) of the structure shown in Formula II above. Usually, the hard segments of the elastomers of the invention constitute 10 to 30 percent by weight of the total elastomer. Preferably the hard segments amount to 15 to 27%. Note that another diol or diacid can be included in the hard segments, in small amounts usually totalling no more than about 10% of the weight of structural formula II above. Such small amounts have little detrimental effect on the desirable properties of the elastomers of the invention.

Although the preceding discussion refers to "terephthalic acid or 2,6-naphthalenedicarboxylic acid" for reaction with glycols or diols to form the required soft and hard segments of the elastomer of the invention, the quoted dicarboxylic acids as used herein, are intended to include equivalents of these dicarboxylic acids which have two functional carboxyl groups and which perform substantially like dicarboxylic acids in reaction with glycols and diols in forming copolyetherester polymers. These equivalents include esters and ester-forming derivatives, such as acid halides and anhydrides.

The elastomers described herein can be made conveniently by starting with a conventional ester interchange reaction. For example, the dimethyl ester of terephthalic acid or 2,6-naphthalene dicarboxylic acid is heated with a long chain glycol and an excess of diol in the presence of a catalyst at 150°-260° C. while distilling off methanol formed by the ester interchange. Depending on temperature, catalyst, glycol excess, and equipment, this reaction can be completed within a few minutes to a few hours. This procedure results in the preparation of a prepolymer which can be increased in molecular weight by the procedure described below. Such prepolymers can also be prepared by known alternative esterification or ester interchange processes. For example, the long chain glycol can be reacted with a high or low molecular weight short chain ester homopolymer or copolymer in the presence of catalyst until randomization occurs. The short chain ester homopolymer or copolymer can be prepared by ester interchange from the dimethyl esters and low molecular weight diols, as above, or from the free acids with the diol acetates. Alternatively, the short chain ester copolymer can be prepared by direct esterification from appropriate acids, anhydrides, or acid chlorides, for example, with diols or by other processes such as reaction of the acids with cyclic ethers or carbonates. The prepolymer could also be prepared by performing the reactions in the presence of the long chain glycol.

The resulting prepolymer can be carried to high molecular weight by distillation of the excess of short chain diol by the known process of polycondensation. Additional ester interchange occurs during this polycondensation or distillation; the distillation serves to increase the molecular weight and to randomize the arrangement of the copolyester units. Best results are usually obtained if this final distillation or polycondensation is run at less than 5 mm. Hg pressure and about 220°-260° C. for less than 6 hours, e.g., 0.5 to 5 hours in the presence of conventional antioxidants. Most practical polymerization techniques rely upon ester interchange to complete the polymerization reaction. To avoid excessive residence time at high temperatures and possible accompanying thermal degradation, a catalyst can be employed in the ester interchange. Preferred catalysts are tetrabutyl titanate (TBT) and/or butylstannoic acid.

Ester interchange polymerizations are generally conducted in the melt without added solvent, but inert solvents can be added to facilitate removal of volatile components at low temperatures. This technique is especially valuable during prepolymer preparation, for example, by direct esterification. Other special polymerization techniques can be useful for preparation of specific polymers. Polycondensation of prepolymer can also be accomplished in the solid phase by heating divided solid prepolymer in a vacuum or in a stream of inert gas to remove liberated low molecular weight diol. This type of polycondensation is referred to herein as "solid phase polymerization" (or abbreviated "SPP").

Batch or continuous methods can be used for the processes described above or for any stage of copolyester polymer preparation. Continuous polymerization, by ester interchange with a prepolymer, is a well established commercial process and usually is preferred.

In preparing elastomers of the invention, it is sometimes desirable to incorporate known branching agents to increase elastomer melt strength. In such instances, branching agent is used in a concentration of 0.001 to 0.005 equivalents per 100 grams of polymer. The branching agent can be a polyol having 3-6 hydroxyl groups, a polycarboxilic acid having 3 or 4 carboxyl groups or a hydroxyacid having a total of 3-6 hydroxyl and carboxyl groups. Representative polyol branching agents include glycerol, sorbitol, pentaerytritol, 1,1,4,4-tetrakis(hydroxymethyl)cyclohexane, trimethylol propane, and 1,2,6-hexanetriol. Suitable polycarboxylic acid branching agents include hemimellitic, trimellitic, trimesic, pyromellitic, 1,1,2,2-ethanetetracarboxylic, 1,1,2-ethanetricarboxylic, 1,3,5-pentanetricarboxylic, 1,2,3,4-cyclopentanetetracarboxylic and like acids. Although the acids can be used as is, it is preferred to use them in the form of their lower alkyl esters.

Conventional additives can be incorporated into the copolyetherester elastomers by known techniques. The additives can function as antioxidants, ultraviolet light stabilizers, fillers, pigments, and the like.

In acccordance with the present invention, the weight percent of hard segment in the elastomer is in the range of 10 to 30%, preferably 15 to 27%. Depending on the composition of the hard segment, the preferred mole ratio of hard segment to soft segment is in the following range:

| HS | HS/SS Range |
| --- | --- |
| 4G/T | 2-5 |
| 2G/T | 3-5 |
| 2G/2,6-N | 1.5-2.5 |
| 4G/2,6-N | 1.5-2.5 |

When the HS/SS of the elastomer is below the preferred minimum value of the range, the elastomer usually possesses an undesirably low tenacity and low melting temperature. As HS/SS is increased within the preferred range, heat stability is improved, though set increases. However, increases in soft segment molecular weight usually is accompanied by desirable decreases in set. Above the maximum preferred value of HS/SS, difficulties often are encountered in melt processing the elastomer.

Test Procedures

The various characteristics and properties mentioned in the preceding discussion and in the Examples below were determined by the following test procedures.

Inherent viscosity, in deciliters per gram (dL/g), is determined in accordance with W. R. Sorenson and T. W. Campbell, "Preparative Methods of Polymer Chemistry", Interscience Publishers, 2nd Ed. (1968) p. 44. A solution of 0.5 gram of polymer in 100 ml of m-cresol at 30° C. is used.

The concentration of the hard segment in the polymer is calculated by the following formula, $$\% \ HS = \text{weight percent hard segment} = \frac{100(M_{hs})[(w_1/M_1) - (w_2/M_2)]}{(M_{hs})[(w_1/M_1) - (w_2/M_2)] + (M_{ss})(w_2/M_2)}$$

wherein w is weight
M is molecular weight and subscript
hs refers to hard segment (short chain ester)
ss refers to soft segment (long chain ester)
1 refers to the dimethyl ester of the starting diacid and
2 refers to the long chain glycol.

Note that the weight of the long chain glycol, as used in the formula, must have the weight of inert oligomeric cyclic ethers subtracted from the total weight of the glycol. The oligomeric ethers usually amount to about 2 weight percent.

Number average molecular weight of the glycol is determined by reacting the glycol with an excess of acetic anhydride in pyridine and then back-titrating with sodium hydroxide to measure the amount of acetic acid produced.

Melting temperature is measured with a Du Pont Model 9900 Differential Scanning Calorimeter (DSC) in accordance with B. Wunderlich, "Thermal Analysis", published by Rensselaer Polytechnic Institute (1981), and is defined as the temperature at the lowest point of the endotherm of transition to an isotropic melt observed on a second heat cycle.

Tenacity at break, T, in grams per denier (gpd) and percent elongation at break, E, are measured on an Instron Tester equipped with Series 2712 (002) Pneumatic Action Grips in accordance with ASTM Method D 2653-72, "Standard Test Method for Breaking Load and Elongation of Elastomeric Yarns". However, for Examples VIII-X below, points of contact between the sample filaments and the grips were cushioned by rubber pads which prevented slippage as filament diameter decreased on stretching. The use of the rubber pads results in somewhat higher tenacities being recorded than would be measured without the pads on the grips.

"Unload power", (i.e., cN/tex$_{eff}$) is measured in accordance with the general method of ASTM D 2731-72, "Standard Test Method for Elastic Properties of Elastomeric Yarns". Three filaments, a 2-inch (2.5-cm) gauge length and a zero-to-300% elongation cycle are used for each determination. Unload power (i.e., the stress at a particular elongation) is measured after the samples have been cycled five times at a constant elongation rate of 800% per minute and then held at the 300% extension for half a minute after the fifth extension. While unloading from this last extension, the stress, or unload power, is measured at various elongations. Unload powers are reported herein at elongations of 60, 100 and 210%, and are respectively designated UP$_{60}$, UP$_{100}$ and UP$_{210}$.

The % set also was measured in accordance the method of ASTM Method D 2731-72. Unload power is given in deciNewtons per effective tex (dN/tex$_{eff}$) except in Tables 1-8 below, in which, for easier readability, the unload power values are multiplied by 1,000 and are therefore in "milli" deciNewtons per effective tex (i.e., $10^{-3}$ dN/tex$_{eff}$).

"Heat stability" of the elastomeric fiber is determined by heating a weighted sample of the fibers. A 10-cm long multifilament yarn sample of about 500 to 1,000 dtex is suspended for fifteen minutes in an oven heated to 130° C. A weight, which hangs from the sample, is adjusted to impose a stress of 0.04 grams per original denier (0.044 g/dtex) on the sample. The sample is judged to fail the heat stability test if (a) the sample breaks during the test or (b) the sample is still deformed to more than three times its original length after sample has been returned to room temperature and the weight has been removed from the sample.

"Heat Setting Efficiency" is determined at a given temperature, by heating a filament sample for 30 seconds at that temperature, while the sample is extended to three times its original length. The original, stretched and final (i.e., relaxed after heat treatment) denier of the filaments are measured and respectively designated $d_o$, $d_x$ and $d_f$. Heat Setting Efficiency is then defined by the expression $$100(d_o-d_f)/(d_o-d_x).$$

The examples which follow are illustrative of the present invention and are not intended to limit the scope, which is defined by the claims. In the Examples, Tables and Figures, samples identified with arabic numerals are of the invention and those identified with upper-case letters are comparison samples which are outside the invention.

EXAMPLES I–VII

Examples I, II and III demonstrate the improved set and unload power possessed by fibers made with elastomer of the invention having a 4G/T hard segment and a THF/3-MeTHF copolyether in the soft segment over similar fibers having no 3-MeTHF comonomer in the elastomer. The improvements are shown in Example I for elastomer fibers having soft segments prepared from glycols of about 2,000 nominal number average molecular weight; Example II, for MW at about 2,800; and Example III, for MW at about 3,500 and above. The over-all ranges covered by these examples are (a) for MW, about 1850 to about 5,000 and (B) for mol ratio of hard segment to soft segment (HS/SS), about 2.4 to 4.5.

In Example IV, the advantages in set and unload power are demonstrated with elastomeric fibers of the invention in which the hard segments are of 2G/T. In Examples V and VI, the advantages are shown for elastomeric fibers in which the hard segments are respectively 4G/2,6-N and 2G/2,6N. Example VII illustrates the invention with an elastomeric fiber having a 4G/T hard segment and a soft segment that includes a copolyether of tetrahydrofuran and propylene oxide (THF/PO).

The following general procedures were employed to prepare the elastomers and fiber samples of Examples I–VII. Characteristics of the elastomers and mechanical properties of the fibers are summarized in accompanying Tables 1–7 and in FIGS. 1–5.

Tetrahydrofuran/3-methyltetrahydrofuran (THF/MeTHF) copolymer for the elastomers of Examples I–VII was prepared as follows. A 96-gram weight of fluorosulfonic acid was added to a 2,500-gram mixture of 14% 3-MeTHF in THF, which mixture had been cooled to 10° C. The mixture was maintained at 35° C. for four hours and then quenched with 1,200 ml of water. Unreacted THF and 3-MeTHF were distilled off and the resultant copolymer was washed two times with 1,200 ml of water. The copolymer was then neutralized with lime, dried under vacuum at 120° C. and filtered. The resulting copolymer had a molecular weight of 3,217 (as determined by titration of end groups) and contained 7 mole percent of 3-MeTHF (determined by proton nuclear magnetic resonance from the ratio of methyl protons to internal chain protons). Other THF/MeTHF copolymers having different concentrations of 3-MeTHF were prepared in a similar manner.

To prepare elastomer for comparison sample "A" of Table 1, the following weights of ingredients were placed in a 300-cm³ kettle, equipped for distillation:
29.5 grams of polytetramethyleneether glycol (also called polytetrahydrofuran glycol, p-THF) having a number average molecular weight about 2,000 and containing about 2 weight % of oligomeric cyclic ethers
10.0 grams of 1,4-butanediol (4G)
10.9 grams of dimethyl terephthalate (DMT)
0.15 gram of AO-330 antioxidant and
1.5 cm³ of 5% by weight tetrabutyl titanate (TBT) catalyst in ethylene glycol.

These amounts were calculated to give a theoretical yield of 40 grams of polymer. The weight percent of hard segment (HS) was 23.0, and the mol ratio of hard segment to soft segment (HS/SS) was 2.89.

A stainless steel stirrer, fitted with a paddle cut to conform with the internal radius of the kettle flask was positioned about 0.3 cm (⅛ inch) from the bottom of the kettle. The stirrer was started. Then, the kettle and its contents were placed in a Woods metal bath heated to 237° C. for 45 minutes, during which time stirring was continued and methanol was distilled from the mix. The pressure on the system was then reduced over the course of an hour to 0.3 mm of mercury. Distillation was continued at the reduced pressure for another hour. The resulting viscous molten product was removed from the kettle and allowed to cool. The cooled product was cut into small pieces and immersed for several hours in acetone to remove the oligomeric cyclic ethers that were present. The acetone was then decanted and fresh acetone containing about one percent of "Irganox" 1098 antioxidant was added. The acetone was then removed by gentle reflux. The antioxidant was thereby imbibed by the elastomer. The elastomer was then dried for 24–48 hours at 100°–110° C. under vacuum with a slight nitrogen bleed. The resultant elastomer had an inherent viscosity of 1.81.

Except for moderate changes in the reaction temperatures and/or ester interchange catalyst, the other elastomer compositions described in Tables 1–7 were prepared in a similar manner. Usually temperatures higher than 260° C. were avoided because at such temperatures, the rate of polymer degradation begins to compete with the rate of polymerization. Usually, but not always, the polymers were extracted as described above. In some cases the antioxidant was added as a surface powder prior to drying in preparation for spinning. Sometimes, when the molecular weight of the resultant elastomer, as determined from its inherent viscosity (e.g., below about 1.65), was not high enough for good filament properties, the molecular weight was increased by solid phase polymerization (SPP) by heating the elastomer at 160° C. for 12 to 72 hours. The amount of SSP used depended on how much the initial inherent viscosity was below the desired range of about 1.65 to 2. Elastomer samples that were subjected to SPP are designated with a superscript "s".

Approximately 20 grams of each elastomer sample were melt-spun at about 180°–260° C. into filaments which were collected on bobbins at draw ratios of about 2× and 3×. Tenacity, elongation at break, and set and unload power were determined. For Examples I–VII, the values reported for T, E and UP were the best individual filament results and % set was the average of three determinations. In the Tables 1–7, the values reported are for the drawn filaments (whether at about 2 or 3× draw) which gave the best results.

To perform the melt spinning, a cylindrical cell of 2.2-cm (⅞-inch) inside diameter and 12.7-cm (5-inch) length was employed. The cell was equipped with a hydraulically driven ram that was inserted on top of the sample. The ram had a replacable "Teflon" tip designed to fit snugly inside the cell. An annular electric heater which surrounded the lower quarter of the cell was used for controlling cell temperature. A thermocouple inside the cell heater recorded the "cell temperature". Attached to the bottom of the cell was a spinneret, the interior of which included a cylindrical passage, measuring 1.27 cm (0.5 inch) in diameter and 0.64 cm (0.25 inch) in length, which was connected to the bottom of the cell cavity. The spinneret cavity contained stainless steel filters of the following mesh, inserted in the following order, starting from the bottom (i.e., closet to the exit): 50, 50, 325, 50, 200, 50, 100, and 50. A compressible annular aluminum seal was fitted to the top of the "stack" of filters. Below the filters was a cylindrical passage of about 2.5-cm (1-inch) length and 0.16-cm (1/16 inch) interior diameter, the lower end of which was tapered (at an angle of 60 degrees from the vertical) to meet with an outlet final orifice measuring 0.069 cm (0.027 inch) in length and 0.023 cm (0.009 inch) in inside diameter. The spinneret temperature was controlled by a separate annular heater.

A sample of dried elastomer having an inherent viscosity in the range of about 1.6 to 2 was cut into small pieces and lightly dusted with antioxidant AO-330. The dried pieces were placed in the above-described cell which had been preheated to a temperature of about 100° C. under a stream of dry nitrogen. A pressure of about 34,500 kPa (5,000 psig) was applied to the sample and cell and spinneret temperatures were raised until a filament began to extrude. Then, temperatures were adjusted, usually raised, until the molten filament no longer exhibited melt fracture and could be drawn 4× at a throughput of about 0.5 gram per minute. At that throughput, the filament sample was forwarded in succession to (a) a take-up roll rotating at 40 meters/min, on which four wraps were made, (b) a draw roll, the speed of which was increased in proportion to the desired draw rate and around which four wraps of filament were made, and (c) a bobbin, which revolved at a rate that was slightly lower than that of the draw roll, and on which the filament was wound. Although a finish could be applied to the filament before or as it arrived at the take-up roll to prevent interfilament adhesion, none of the filaments of Examples I–VII required a finish when melt-spun at the 0.5-g/hr throughput.

Properties of the sample were then measured. The results are recorded in the tables, wherein column headings "T" and "E" respectively refer to the tenacity and elongation at break of the sample and all other abbreviations are as previously defined.

TABLE 1

| Sample | % HS | MW | Me-THF | HS/SS | T | E | $UP_{100}$ | $UP_{60}$ | % Set |
|---|---|---|---|---|---|---|---|---|---|
| HS = 4G/T, MW = ~2,000 (Example I and FIG. 1) | | | | | | | | | |
| Invention | | | | | | | | | |
| 1$^s$ | 19.3 | 2171 | 3 | 2.50 | 0.533 | 436 | 16.1 | 5.0 | 39.3 |
| 2 | 25.1 | 2171 | 3 | 3.50 | 0.759 | 465 | 12.0 | 0 | 59.3 |
| 3 | 21.0 | 2127 | 8 | 2.73 | 0.528 | 470 | 22.0 | 7.8 | 35.0 |
| 4 | 25.4 | 2127 | 8 | 3.50 | 0.786 | 347 | 13.0 | 0 | 50.8 |
| 5 | 21.0 | 1867 | 12 | 2.41 | 0.612 | 451 | 25.2 | 6.7 | 40.3 |
| 6 | 23.5 | 1867 | 12 | 2.78 | 0.780 | 436 | 22.4 | 4.2 | 43.7 |
| 7 | 30.0 | 1867 | 12 | 3.89 | 0.788 | 392 | 12.1 | 0 | 66.3 |
| 8 | 22.0 | 2368 | 20 | 3.20 | 0.528 | 518 | 23.9 | 7.4 | 33.3 |
| 9$^s$ | 23.6 | 2368 | 20 | 3.50 | 0.534 | 366 | 19.8 | 2.5 | 41.3 |
| 10*$^s$ | 24.7 | 1941 | 7 | 3.09 | 0.560 | 543 | 14.5 | 0 | 52.7 |
| 11+ | 24.8 | 1911 | 8 | 3.06 | 1.02 | 379 | 17.6 | 0 | 47.5 |
| Comparisons | | | | | | | | | |
| A | 23.0 | 2000 | 0 | 2.89 | 0.578 | 339 | 11.3 | 0 | 54.5 |
| B | 25.1 | 2000 | 0 | 3.25 | 0.841 | 459 | 11.9 | 0 | 61.1 |
| C$^s$ | 29.2 | 2000 | 0 | 4.00 | 0.632 | 556 | 0 | 0 | 84.7 |

*a blend: 50 wt % MW 1885 (15) and 50 wt % MW 2000(0). The mole % of MeTHF is in parenthesis.
+a blend: 65 wt % MW 1867 (12) and 35 wt % MW 2000(0).

TABLE 2

| Sample | % HS | MW | Me-THF | HS/SS | T | E | $UP_{100}$ | $UP_{60}$ | % Set |
|---|---|---|---|---|---|---|---|---|---|
| HS = 4G/T, MW = ~2,800 (Example II and FIG. 2) | | | | | | | | | |
| Invention | | | | | | | | | |
| 13 | 17.0 | 2553 | 3 | 2.50 | 0.945 | 417 | 17.6 | 6.0 | 28.7 |
| 14 | 22.0 | 2553 | 3 | 3.44 | 0.720 | 360 | 14.3 | 2.4 | 44.2 |
| 15$^s$ | 24.7 | 2553 | 3 | 4.00 | 0.496 | 486 | 10.4 | 0 | 54.0 |
| 16$^s$ | 17.8 | 2673 | 7 | 2.75 | 0.556 | 433 | 15.7 | 5.6 | 43.3 |
| 17 | 20.0 | 2673 | 7 | 3.19 | 0.647 | 420 | 18.0 | 6.4 | 34.2 |
| 18 | 21.6 | 2673 | 7 | 3.50 | 0.731 | 458 | 21.3 | 7.4 | 34.7 |
| 19 | 18.0 | 2975 | 12 | 3.10 | 0.509 | 495 | 25.7 | 9.6 | 31.3 |
| 20 | 20.0 | 2975 | 12 | 3.52 | 0.585 | 500 | 26.7 | 9.4 | 33.0 |
| 21 | 22.0 | 2975 | 12 | 4.00 | 0.570 | 467 | 24.8 | 8.5 | 33.0 |
| 22$^s$ | 20.0 | 2761 | 15 | 3.29 | 0.628 | 420 | 23.5 | 8.3 | 31.3 |
| 23* | 21.0 | 2460 | 8 | 3.13 | 0.558 | 442 | 18.5 | 5.6 | 35.0 |
| 24+ | 21.0 | 2952 | 4.4 | 3.72 | 0.720 | 438 | 17.7 | 6.7 | 36.0 |
| Comparisons | | | | | | | | | |
| D | 17.0 | 2900 | 0 | 2.82 | 0.819 | 336 | 11.2 | 2.4 | 46.7 |
| E | 20.0 | 2900 | 0 | 3.44 | 0.371 | 443 | 12.3 | 4.5 | 45.0 |
| F | 23.0 | 2900 | 0 | 4.11 | 0.706 | 388 | 8.7 | 0 | 64.0 |

*Blend: 54 wt % MW 3685(15), 40 wt % MW 2000(0) and 6% wt % MW 1000 (0).
+Blend: 60 wt % MW 2900 (0), 37 wt % MW 3685 (15) and 3 wt % MW 1000 (0).

TABLE 3

| Sample | % HS | MW | Me-THF | HS/SS | T | E | $UP_{100}$ | $UP_{60}$ | % Set |
|---|---|---|---|---|---|---|---|---|---|
| HS = 4G/T, MW = ~3,500 and above (Example III and FIG. 3) | | | | | | | | | |
| Invention | | | | | | | | | |
| 25 | 15.5 | 3774 | 3 | 3.25 | 0.777 | 524 | 14.2 | 7.5 | 28.0 |
| 26 | 18.0 | 3774 | 3 | 3.90 | 0.566 | 596 | 11.6 | 4.1 | 44.5 |
| 27 | 13.9 | 3606 | 7 | 2.75 | 0.880 | 430 | 22.5 | 15.4 | 19.7 |
| 28 | 21.0 | 3606 | 7 | 4.51 | 0.811 | 378 | 21.2 | 4.6 | 30.3 |
| 29$^s$ | 15.0 | 3500 | 15 | 2.91 | 0.346 | 493 | 22.2 | 11.5 | 27.0 |
| 30$^s$ | 15.0 | 3785 | 15 | 3.14 | 0.393 | 488 | 19.6 | 8.1 | 25.3 |
| 31 | 18.0 | 3685 | 15 | 3.81 | 0.425 | 430 | 22.2 | 7.7 | 31.7 |
| 32$^s$ | 20.0 | 3500 | 15 | 4.12 | 0.454 | 519 | 18.8 | 4.8 | 34.7 |
| 33 | 14.5 | 3446 | 20 | 2.75 | 0.397 | 636 | 25.9 | 11.4 | 25.3 |
| 34 | 15.6 | 3446 | 20 | 3.00 | 0.351 | 604 | 25.0 | 9.2 | 28.0 |
| 35 | 16.7 | 3446 | 20 | 3.25 | 0.498 | 485 | 27.4 | 10.0 | 24.7 |
| 36$^s$ | 10.9 | 5000 | 15 | 2.85 | 0.358 | 470 | 18.8 | 9.1 | 19.7 |
| 37* | 21.0 | 3246 | 7.5 | 4.08 | 0.828 | 408 | 24.9 | 11.3 | 22.2 |
| Comparisons | | | | | | | | | |
| G | 15.3 | 3394 | 0 | 3.00 | 0.589 | 545 | 7.9 | 0 | 60.7 |
| H | 21.0 | 3607 | 0 | 4.51 | 0.576 | 525 | 6.7 | 0 | 55.3 |

*Blend of 50% MW 3685 (15) and 50% MW 2900 (0).

Sample 37 was heat relaxed in boiling water at 100° C. for ½ hour. The filaments had the following properties (units are the same as in the tables):

T=0.510
E=613
$UP_{100}$=0.0241

$UP_{60} = 0.0138$

% Set = 17.3

Note the higher break elongation, the higher unload power at the 60% elongation and the improved (i.e., lower) set that resulted from the relaxed heat treatment of the filament.

All of the elastomers of Examples I, II and III had melting temperatures in the range of 150° to 195° C. As the ratio of hard segment to soft segment (HS/SS) was increased, the melting temperature of the elastomer also was increased.

TABLE 4

Figure 1:
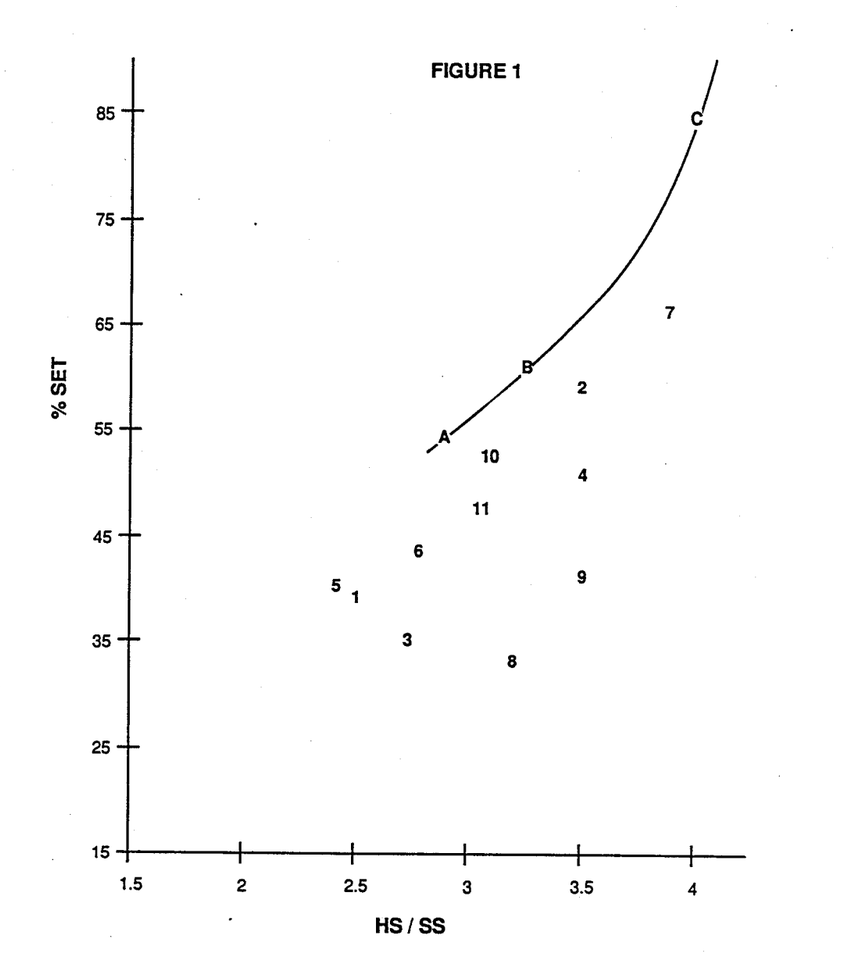
FIGS. 1, 2 and 3, present the data of percent set versus hard-to-soft segment molar ratio for the elastomers of Examples I, II and III respectively, which elastomers have 4G/T hard segments and soft segments of different molecular weight.
Figure 2:
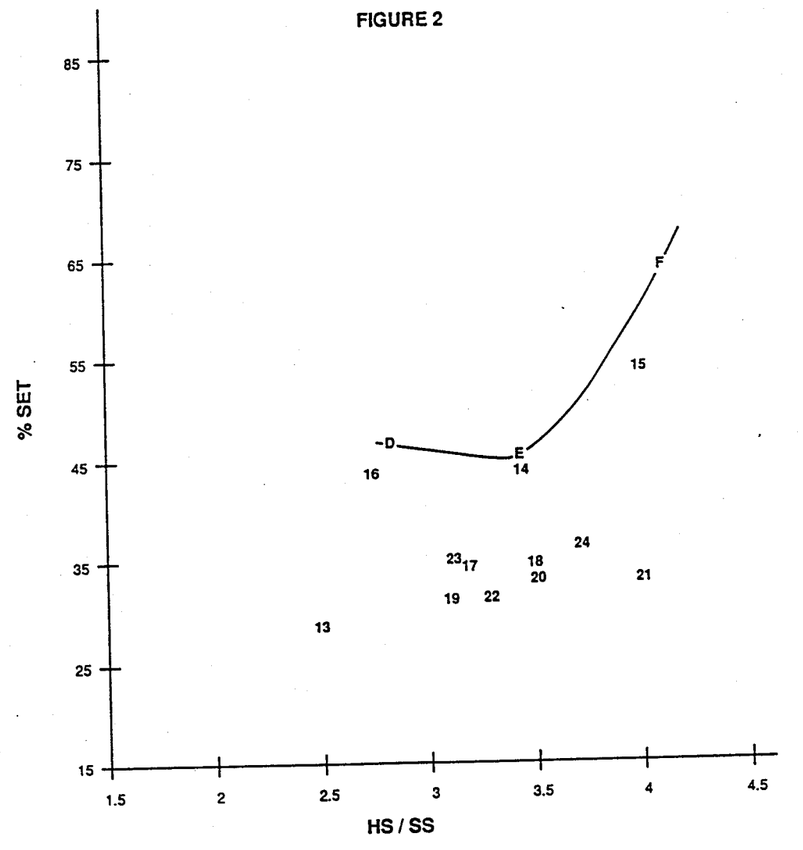
Figure 3:
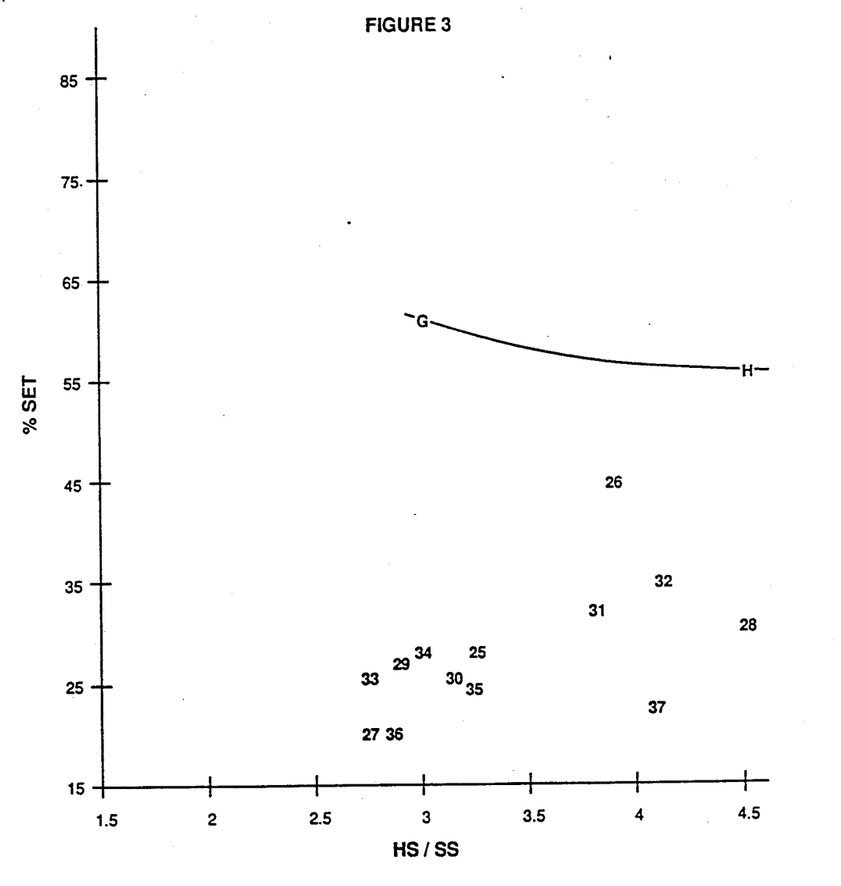
Figure 4:
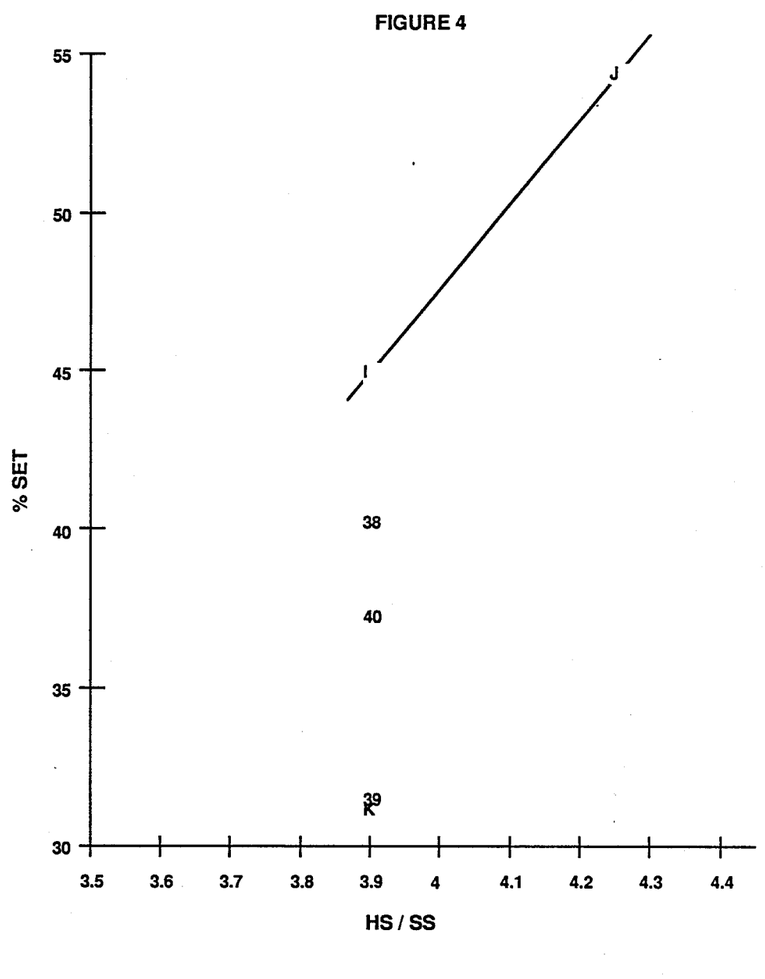
FIG. 4 presents the data for the elastomers of Example IV which elastomers have hard segments of 2G/T.

HS = 2G/T (Example IV and FIG. 4)

| Sample | % HS | MW | Me-THF | HS/SS | T | E | $UP_{100}$ | $UP_{60}$ | % Set |
|---|---|---|---|---|---|---|---|---|---|
| Invention | | | | | | | | | |
| 38[s] | 25.3 | 2081 | 8 | 3.90 | 0.679 | 321 | 13.8 | 0 | 40.3 |
| 39 | 20.7 | 2673 | 7 | 3.90 | 0.505 | 561 | 20.6 | 8.1 | 31.5 |
| 40* | 23.6 | 2288 | 7 | 3.90 | 0.598 | 371 | 19.9 | 6.2 | 37.3 |
| Comparisons | | | | | | | | | |
| I | 26.0 | 2000 | 0 | 3.90 | 0.760 | 453 | 12.7 | 0 | 45.0 |
| J | 27.7 | 2000 | 0 | 4.25 | 0.641 | 507 | 12.6 | 0 | 54.5 |
| K | 19.8 | 2900 | 0 | 3.90 | 0.546 | 423 | 11.9 | 5.3 | 31.3 |

*Blend: 70 wt % MW 2000 (0) and 30 wt % MW 3446 (20).

TABLE 5

Figure 5:
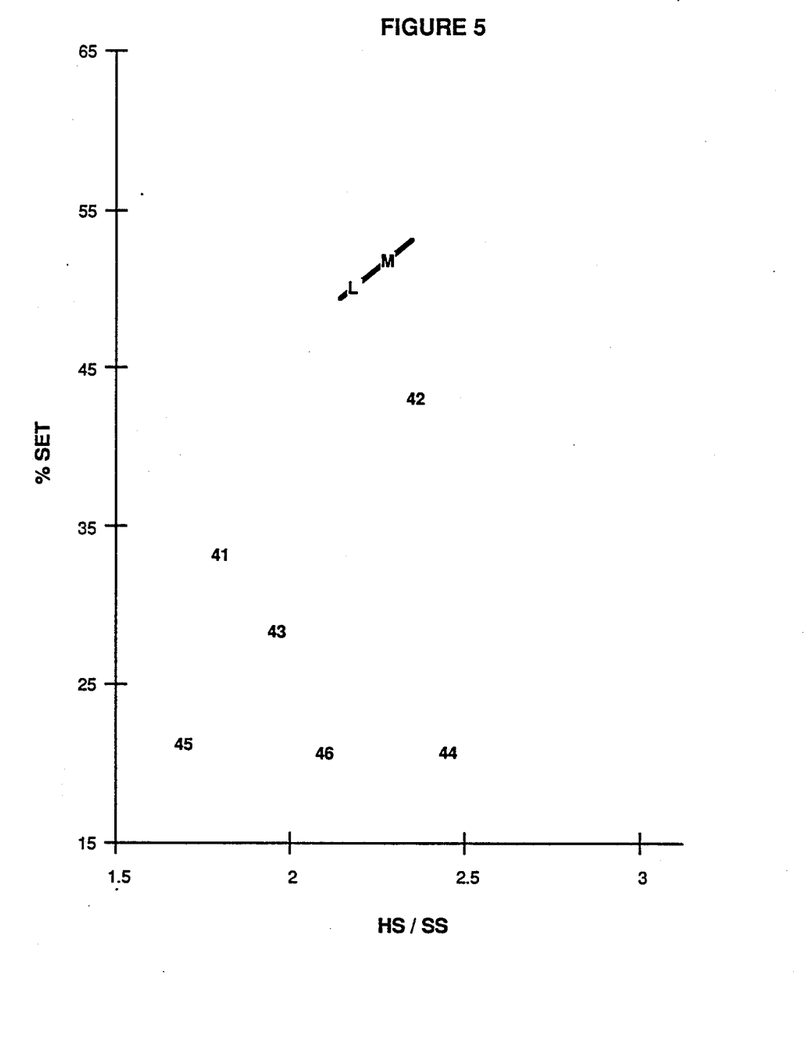
FIG. 5 presents the data for the elastomers of Example V which have hard segments of 4G/2,6-N.

HS = 4G/2,6-N (Example V and FIG. 5)

| Sample | % HS | MW | Me-THF | HS/SS | T | E | $UP_{100}$ | $UP_{60}$ | % Set |
|---|---|---|---|---|---|---|---|---|---|
| Invention | | | | | | | | | |
| 41 | 17.7 | 2081 | 7 | 1.80 | 0.691 | 428 | 20.9 | 8.6 | 33.2 |
| 42 | 22.0 | 2081 | 7 | 2.36 | 0.665 | 393 | 20.7 | 6.0 | 43.0 |
| 43 | 16.0 | 2613 | 8 | 1.97 | 0.690 | 389 | 21.8 | 9.9 | 28.3 |
| 44 | 15.0 | 3606 | 7 | 2.47 | 0.518 | 498 | 18.9 | 10.9 | 20.7 |
| 45 | 10.4 | 3685 | 15 | 1.71 | 0.440 | 481 | 16.0 | 6.7 | 21.3 |
| 46 | 13.0 | 3685 | 15 | 2.11 | 0.408 | 561 | 21.8 | 10.8 | 20.7 |
| Comparisons | | | | | | | | | |
| L | 21.3 | 2000 | 0 | 2.18 | 0.648 | 373 | 10.6 | 2.2 | 50.2 |
| M | 22.0 | 2000 | 0 | 2.28 | 0 653 | 353 | 11.6 | 0 | 51.7 |

TABLE 6

HS = 2G/2,6-N MW = ~2000 (Example VI)

| Sample | % HS | MW | Me-THF | HS/SS | T | E | $UP_{100}$ | $UP_{60}$ | % Set |
|---|---|---|---|---|---|---|---|---|---|
| Invention | | | | | | | | | |
| 47[s] | 18.1 | 2171 | 3.6 | 2.15 | 0.655 | 410 | 18.9 | 6.5 | 34.3 |
| Comparison | | | | | | | | | |
| N[s] | 20.0 | 2000 | 0 | 2.25 | 0.673 | 393 | 0 | 0 | 81.0 |

TABLE 7

SS with THF/PO(propylene oxide) copolyether
HS = 4G/T (Example VII)

| Sample* | % HS | MW | mole % PO | HS/SS | T | E | $UP_{100}$ | $UP_{60}$ | % Set |
|---|---|---|---|---|---|---|---|---|---|
| Invention | | | | | | | | | |
| 12[s] | 20.7 | 2300 | 10 | 2.89 | 0.692 | 480 | 15.7 | 3.9 | 41.0 |
| Comparison | | | | | | | | | |
| O | 23.0 | 2000 | 0 | 2.89 | 0.645 | 401 | 8.0 | 0 | 68.3 |

*Each sample of Ex. VII was made with 0.15 weigh % of trimethyltrimellitate branching agent.

It was noted that drawing of the melt-spun elastomer filaments improved the tenacity, unload power and set of the filaments as compared to the same filaments which were not drawn. A similar improvement could be obtained by melt-spinning the filaments at a sufficiently high speed. Also, the elastomeric filaments could, if desired, be heat treated (under tension or relaxed). This usually resulted in the tenacity and set decreasing and the elongation to break increasing. However, because of economic considerations, such heat treatment usually would be avoided. It is preferred to provide the as-spun (and drawn) filaments with the desired properties without subsequent heat treatment. Properties could be enhanced further, by solid phase polymerizing the as-spun or heat-treated filaments (relaxed or under tension).

EXAMPLE VIII

Elastomer of the invention, Sample 48, was made in a monomer still/autoclave system as follows. The still was charged with:

5.571 kg of p-THF (2000 MW), 8.188 kg of p-THF (3100 MW) containing of 13.5 mole percent of 3-MeTHF made by blending 90 wt % of (3800 MW) containing 15 mole % 3-MeTHF and 10% THF (1000 MW), 90.8 g of Antioxidant AO-330, 4.404 kg of dimethyl terephthalate, 3.120 kg of 1,4 butanediol, and 36.3 g tetrabutyl titanate.

This composition was calculated to have 20.9 wt % 4GT hard segment and a 3.20 HS/SS mole ratio. The mixture was heated to 225° C. to remove methanol and then the resultant prepolymer was placed in an autoclave and agitated. Pressure was reduced from atmospheric to about 1-2 mm Hg and the contents heated to 248° C. over about 120 minutes. Agitator speed was reduced as the viscosity increased, as measured by agitator torque. Twelve batches of elastomer, totalling 151 kg, were made in this manner.

The elastomer was forced from the autoclave through three 0.64-cm (0.25-inch) diameter openings, cast onto a water-flooded belt and then cut into pellets of about 0.25 cm (0.1 inch) in diameter by 0.25 to 0.5 cm (0.1 to 0.2 inch) length. The pellets were dried in a vacuum oven at 100° C. for six hours under about 66 cm (26 inches) of Hg vacuum. The elastomer had an average Melt Flow of 9.3 ± 1.6, as measured with a Kayeness, Inc. Model D-0053, Melt Flow Indexer, having a standard 0.210-cm (0.0827-inch) diameter by 0.800-cm (0.315-inch) long orifice and operated with a 2,160-gram load. Melt Flow is defined as the number of grams extruded at 220° C. from the Melt Flow Indexer in 10 minutes.

The dried blended pellets were spun on a spinning machine consisting of a screw melter, a spinning block with gear metering pumps, and a spinning pack with 108 capillaries of 0.0635-cm (0.025-inch) diameter by 0.097-cm (0.038-inch) length. Elastomer was metered to produce four threadlines containing 27 filaments each. Typical properties of the as-spun yarn were as follows (averages of four determinations):

| | |
|---|---|
| denier | 869 |
| T, g/den | 0.69 |
| E, % | 668 |
| $UP_{210}$, | 0.0827 |
| % Set | 44 |

The utility of these threads for diaper leg elastification was demonstrated by simulating a diaper machine glue step. The threads were drafted 340% and glued satisfactorily to a polyethylene diaper back sheet. Such a high draft represents a clear advantage for threads of this sample over known elastic materials.

EXAMPLE IX

Another series of elastomers, Samples 49-52, having 9% of 3-MeTHF in a THF/MeTHF copolyether of 2,477 molecular weight were made and melt-spun into filaments by the general procedures of the preceding example. The elastomers were extruded, quenched in water, cut into flake pellets, and dried as described in Example VIII and then screw-melted and spun at 220°-225° C. into threads in a spinning position that included a filter pack and a spinneret with 60 orifices of 0.081-cm (0.032-inch) diameter by 0.114-cm (0.045-inch) length. The threads were quenched in air, combined and coalesced in an air jet, had a finish applied to them and then were wound onto a feed wheel. The denier and properties were adjusted by the feed wheel speed or screw-melter speed. Downstream of the feed wheel, the thread was wound on a package which rotated at a 5-10% slower speed than the feed wheel. Elastomer throughput was 1.94 kg/hour, feed wheel speed was 316 meters/min and windup speed was 311 meters/min. Comparison Sample P was made in the same manner but contained no 3-MeTHF in the soft segment and had a p-THF molecular weight of 2,000. The composition of the elastomer and the properties of the filaments produced therefrom are summarized in Table 8.

TABLE 8

HS = 4GT, MW = 2,477, 9% MeTHF (Example IX)

| Sample | HS | HS/SS | den | T | E | $UP_{210}$ | % Set | Heat Stable |
|---|---|---|---|---|---|---|---|---|
| Invention | | | | | | | | |
| 49 | 18 | 2.55 | 1025 | 0.61 | 571 | 82.7 | 43.5 | no |
| 50 | 21 | 3.09 | 1091 | 0.67 | 449 | 106.5 | 46 | yes |
| 51 | 24 | 3.69 | 1132 | 0.70 | 560 | 103.1 | 52 | yes |
| 52 | 27 | 4.33 | 960 | 0.98 | 566 | 111.0 | 61 | yes |
| Comparison | | | | | | | | |
| P* | 23 | 2.85 | 1093 | 0.64 | 345 | 58.9 | 78 | no |

Comparison P has a 2000 MW and no MeTHF.

The preceding table shows, among other things, that Samples 49-52 of the invention containing 3-MeTHF have advantages over Comparison Sample P in higher unload power and lower set. Also, the samples of the invention that had greater than 20 weight percent hard segment, Samples 50-52, exhibited better heat stability at 130° C. and had lower wet and higher unload power than comparison samples with the same weight percent hard segment but no MeTHF comonomer in the soft segment.

EXAMPLE X

In this example threads formed from an elastomer of the invention are used to elasticate the leg openings of diapers.

Elastomer was produced in a continuous polymerizer system which included: (a) metering pumps for feeding ingredients to the system; (b) an ester-exchange vessel to which dimethyl terephthalate (DMT), poly(tetrahydrofuran/3-methyltetrahydrofuran) copolyether (THF/MeTHF), 1,4-butane diol (4G) and tetrabutyl titanate (TBT) catalyst were fed; (c) two prepolymerizer vessels in series which were operated at temperatures that ranged from 220° to 250° C. and vacuums of 30 to 10 mm of mercury; (d) a "finisher" vessel which operated at 255° to 260° C. and 1 to 2 mm Hg; and (e) a casting die, quench belt, cutter, flake drier and packaging system.

The following weights of materials were metered into the system to produce Sample 53 elastomer of the invention. All weights are given in kilograms per 100 kilograms of elastomer produced, except for the antifoam agent (Dow-Corning Fluid DC-2000) which is listed in parts per million (ppm).

| | |
|---|---|
| DMT | 27.95 |
| 4G (100% excesses) | 21.12 |
| p-THF/MeTHF of 2753 MW having 9 mole % 3-METHF | 70.96 |
| Antioxidant AO-330 | 0.5 |
| TBT Catalyst | 0.25 |
| Antifoam agent | 1 ppm |

The resultant elastomer, which had a Melt Index of 10.7, was screw-melted and melt-spun into filament yarns on the equipment described in Example VIII. Yarns of 888 denier, spun at 278 meters/min (303 yards/min), had the following properties:

| | |
|---|---|
| T | 0.619 |
| E | 696 |
| $UP_{210}$ | 0.0691 |
| Set | 66 |
| Heat stable | yes |

The threads were used to elasticate the leg openings of diapers. An automatic diaper-making machine attached the threads in an extended condition by means of a hot-melt adhesive The threads were attached with extensions as high as 5.0-5.5X. Such high extensions permit more diapers to be made than can be made with the same weight of threads that do not extend as much.

Sample 53 was also used to demonstrate the high temperatures at which these elastomeric threads of the invention could be heat set. An 853 denier yarn was subjected, at an extension to three times its original length, to the heat-setting efficiency test at a series of temperatures. The yarn did not break, until the test was performed at 200° C. The measured heat-setting efficiency in these tests were as follows:

| Temperature (°C.) | Heat-Setting Efficiency (%) |
|---|---|
| 120 | 76 |
| 140 | 85 |
| 160 | 85 |
| 180 | 93 |
| 190 | 99 |
| 200 | Failed |

These data indicate that filaments of the invention could be combined with other textile fibers of synthetic organic polymer and be heat set successfully at some of the temperatures conventionally used to heat set such fibers, (e.g., nylon which can be heat-set at 160°-180° C. in ½ to 1 minute).

We claim:

1. A thermoplastic, segmented, linear copolyetherester elastomer which consists essentially of a multiplicity of recurring intralinear long-chain and short-chain ester units connected head-to-tail through ester linkages, the long-chain ester units amounting to 70 to 90 weight percent of the elastomer and being represented by the structure (I)

and the short-chain ester units amounting to 10 to 30 weight percent of the elastomer being represented by the structure (II)

wherein
- R represents a divalent radical remaining after removal of carboxyl groups from a dicarboxylic acid selected from the group consisting of terephthalic acid and 2,6-naphthalenedicarboxylic acid,
- G represents a divalent radical remaining after removal of hydroxyl groups from a long chain polyalkyleneether glycol containing 80 to 97 mole percent of copolymerized tetrahydrofuran and 3 to 20 mole percent of a copolymerized cyclic alkylene oxide having 2, 3 or 4 carbon atoms and an n-alkyl substituent of 1 to 2 carbon atoms attached to one of the carbon atoms of the cyclic alkylene oxide and has a number average molecular weight in the range of 1,500 to 5,000 and
- D is a divalent radical remaining after removal of terminal hydroxyl groups from a diol selected from the the group consisting of ethylene glycol and 1,4-butane diol.

2. An elastomer of claim 1 wherein the cyclic alkylene oxide is 3-methyltetrahydrofuran.

3. An elastomer of claim 1 or 2 wherein the short chain ester units amount to 15 to 27 weight percent of the elastomer.

4. An elastomer of claim 1 or 2 wherein the mole percent of 3-methyltetrahydrofuran is in the range of 7 to 15.

5. An elastomer of claim 1 or 2 wherein the molecular weight of radical G of formula I is in the range of 2,000 to 3,800.

6. An elastomer of claim 1 or 2 wherein the short chain ester unit is derived from 1,4-butane diol and terephthalic acid and the ratio of short chain ester units to long chain ester units is the range of 2 to 5.

7. An elastomer of claim 1 or 2 wherein the short chain ester unit is derived from ethylene glycol and terephthalic acid and the ratio of short chain ester units to long chain ester units is the range of 3 to 5.

8. An elastomer of claim 1 or 2 wherein the short chain ester unit is derived from ethylene glycol or 1,4-butane diol and 2,6-naphthalene dicarboxylic acid and the ratio of short chain ester units to long chain ester units is the range of 1.2 to 2.5.

9. An elastomer of claim 1 or 2 in the form of a shaped article.

10. A process of using the elastomer claim 1 or 2 wherein filaments of the elastomer are formed by melt spinning the elastomer.

11. A process of claim 10 wherein the melt-spun filaments are drawn in the range of 1.8 to 4×.

12. A process of claim 10 wherein the melt-spun filaments are withdrawn from a spinneret at a speed of at least 250 meters per minute.

13. A process of claim 10 wherein the filament is heat relaxed.

14. A process of claim 10 wherein the filament is heat treated under tension.

15. A process of claim 10 wherein the filament is heat set at a temperature in the range of 160° to 190° C.

16. A process of claim 15, wherein the filament is combined with another synthetic organic fiber before being heat set.

* * * * *